No. 832,148. PATENTED OCT. 2, 1906.
C. T. McCUE.
WHEEL HUB.
APPLICATION FILED JULY 22, 1904.
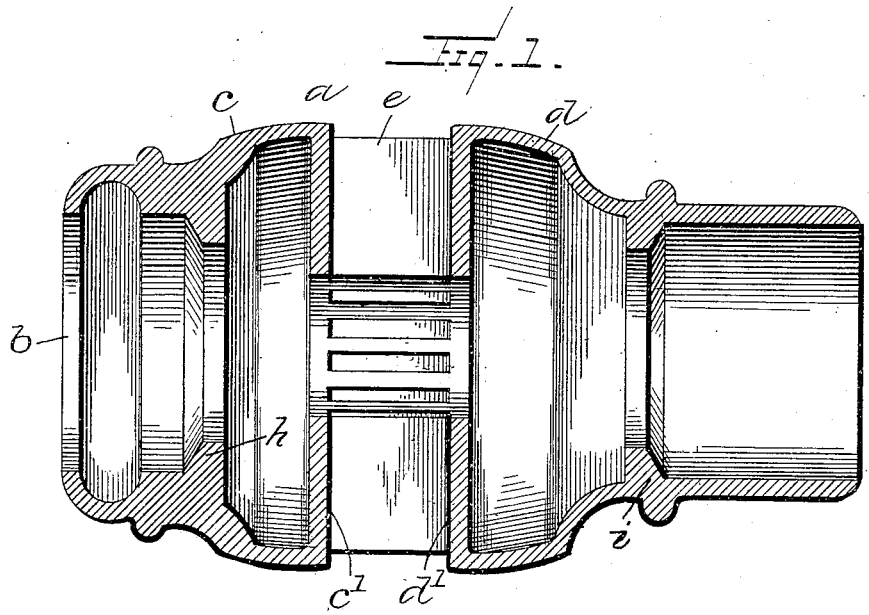
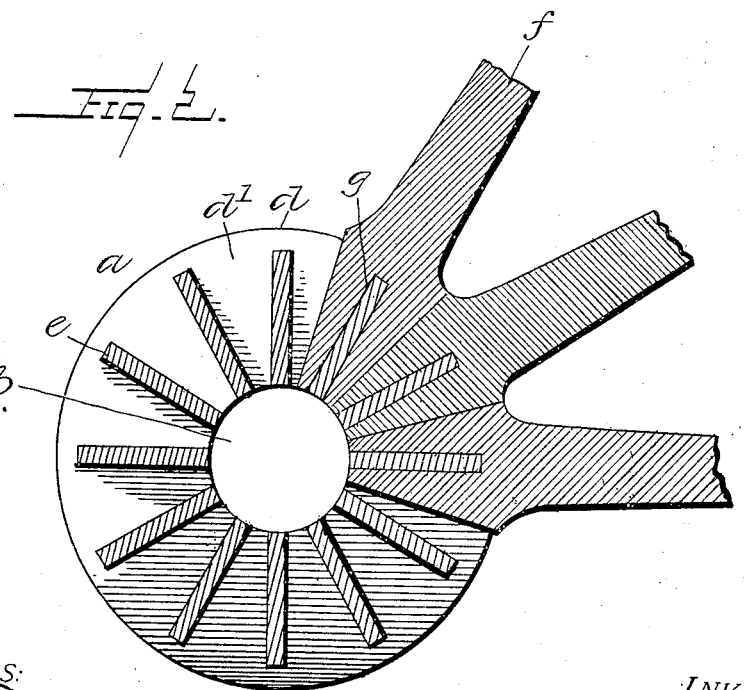
WITNESSES:
INVENTOR
Charles T. McCue.
BY
Jenkins H Barker
Attorneys

UNITED STATES PATENT OFFICE.

CHARLES T. McCUE, OF HARTFORD, CONNECTICUT.

WHEEL-HUB.

No. 832,148.      Specification of Letters Patent.      Patented Oct. 2, 1906.

Application filed July 22, 1904. Serial No. 217,672.

*To all whom it may concern:*

Be it known that I, CHARLES T. McCUE, a citizen of the United States, and a resident of Hartford, in the county of Hartford and State of Connecticut, have invented a new and Improved Wheel-Hub, of which the following is a specification.

My invention relates more especially to the class of vehicle-wheels including spokes in their construction; and the object of my invention is to provide a hub for a vehicle of this class that shall be extremely cheap in construction, while possessing the greatest strength; and a further object is to provide a device that shall be extremely simple in its method of construction, requiring less labor than has heretofore been employed; and a further object is to provide a hub that while being cheap and of great strength shall be extremely sightly and well proportioned.

One form of device possessing the advantages set out in the above objects of my invention is illustrated in the accompanying drawings, in which—

Figure 1 is a view in longitudinal section through a wheel-hub embodying my invention. Fig. 2 is a view in central transverse section of the same.

Heretofore it has been a common practice to provide a cast-metal hub having means for securely holding the spokes therein. In some forms of prior devices the openings for the spokes have been provided in a cast-metal hub and extending radially through the hub, the metal forming the walls on all sides of each of the openings being the same as that composing the hub. In another form of hub a portion of the hub is formed of cast metal with radial openings for the reception of the spokes; but in this form of hub one wall (which may be termed the "side" wall) of each of the openings has been formed by a separate flanged collar, which is placed upon the hub after the spokes have been placed in position. In this form of hub, as well as in some of those having both side walls of the openings formed of the same metal as the hub, rivets have been employed extending lengthwise to the hub through both flanges and through the spokes or between the same for securing the various parts in position. In all of the structures a core, of wood or metal, has been employed to increase the holding power for the spokes and to enable them to be properly secured to successfully withstand the strains to which they are subjected. By the employment of my invention hereinafter described I have provided means whereby both walls of the openings through the hub are formed integral with the hub, and the employment of rivets passing through the flanges is not required and the employment of a core is not necessitated, the hub being so constructed that the spokes may be securely fastened in a manner to successfully resist all strains incident to the use of the wheel.

In the accompanying drawings the letter *a* denotes the body portion of the hub, having an opening *b* extending therethrough for the reception of an axle-box or other bearing for the wheel. This hub is composed of two sections *c d*, in each section of which are located proper chambers or recesses for the bearings of the wheel. These sections are each composed of metal and may be of any desired form; but each section is provided with inwardly-extending flanges *c′ d′*. These flanges are formed integral with the hub in the process of casting and form two walls of spoke-sockets for the reception of spokes, the flanges extending inward to a sufficient degree to provide a firm bearing for the spokes.

The sections *c d* of the hub are united by webs *e*, extending between the flanges *c′ d′*, these flanges forming the remaining walls of sockets extending radially through the hub and for the reception of the spokes. These webs may be arranged at any desired distance apart and in suitable numbers for the special purpose for which the wheel may be designed, the webs extending, preferably, to the inner surface or edge of the flanges *c′ d′*. These webs are formed integral with the sections *c d* of the hub, the sections *c d* and the webs *e* constituting the hub, in fact, being formed of a single piece of metal. In each of the sections *c d* and on opposite sides of the flanges *c′ d′* ribs *h* and *i* are provided, these ribs being located on the inner surface of the hub, the rib *h* being located in the section *c* and the rib *i* in the section *d*. These ribs form cone-bearings and are adapted to coöperate with cones located upon the wheel-axle.

Heretofore and prior to my invention in attempting to produce the spoke-mortises of sufficient depth to provide the required holding power it has been found that the metal composing the hub would be so thick as to increase the weight of the hub beyond a practical point. In order to securely hold the spokes and maintain the shell of the hub of proper thickness, as hereinbefore stated, a core of wood has been employed into which the inner ends of the spokes are inserted for the purpose of properly securing them in position. In some instances a metal core has been employed; but this has also been composed of a separate piece of metal and so constructed as to enable the required lightness to be secured. In constructing a hub in accordance with my invention it will be seen that the two sections c d containing the flanges c' d' and joined by the webs e form a spoke-mortise of a depth sufficient to provide all of the holding strength required and yet the shell of the hub may be maintained of sufficient lightness to present a sightly appearance and retain all of the strength required.

The spokes may be inserted in the mortises in this hub in any desired manner; but in the preferred form of the invention and as shown in Fig. 2 each of the spokes f are bifurcated, as at g, at their inner ends. In inserting the spoke in place the spoke is so located that the webs e lie in the bifurcations in the ends of the spokes, the outer edges of each of two adjacent spokes abutting and resting closely against each other. It will be seen that in the employment of this construction a wheel may be easily assembled, the spokes readily placed in position, and that the parts employed for securing them are reduced to a minimum. When the spokes are placed in position, an extremely rigid and secure structure is the result.

It is obvious that the details of construction may be departed from to a greater or less extent and yet come within the scope of the invention, and I do not desire or intend to limit myself to the exact details herein shown and described so long as the structure consisting of the two end sections joined by webs extending along the flanges is produced.

What I claim as my invention, and desire to secure by Letters Patent, is—

1. As an article of manufacture, a cast-metal hub composed of two end sections each having inwardly-extending flanges joined by integral webs forming spoke-sockets therebetween, said hub also including inwardly-projecting annular ribs forming cone-bearings.

2. In a wheel, a hub formed in the shape of a shell and including two end sections having internally-projecting end flanges joined by integral webs forming spoke-sockets, and an inwardly-projecting annular flange located on each side of said spoke-sockets, and formed to constitute a cone-bearing.

CHARLES T. McCUE.

Witnesses:
H. T. DOLL,
ARTHUR B. JENKINS.